Patented Apr. 1, 1924.

1,488,881

UNITED STATES PATENT OFFICE.

FREDERICK E. JACKSON, OF GROSSE POINTE, MICHIGAN.

INK REMOVER.

No Drawing. Application filed June 6, 1921. Serial No. 475,418.

*To all whom it may concern:*

Be it known that I, FREDERICK E. JACKSON, a citizen of the United States, residing at Grosse Pointe village, in the county of Wayne and State of Michigan, have invented certain new and useful Improvements in Ink Removers, of which the following is a specification.

This invention relates to ink removers. It comprises a paste compound which is especially designed to remove the so-called india or drawing inks and also the black printing inks from drawing paper, such as tracing cloth and vellum paper. These tracing cloths and vellum paper are sized so as to give them a smooth, glossy surface to permit the drawing pen to glide smoothly over the surface and so that the ink will also not run.

It is the object of the present invention to afford an ink remover which will not run when placed upon the paper or cloth and will not injure the finish so as to make it difficult to use the pen again on the place that has been treated. Most of the ink removers that are now in general use are unsuitable for tracing cloths and for vellum paper for the reason that they are thin and consequently run and cannot be kept within the limits of the place intended to be treated. Furthermore, most of them are decidedly acid and will either destroy the finish of the cloth or vellum paper or else actually destroy the fiber and hence are unfit for a drafting room. It is the object of the present invention to provide an ink remover which will avoid these difficulties and be eminently fit for the requirements of the drafting room.

To this end I have experimented and discovered a compound which is believed to possess the desirable characteristics above enumerated. The compound comprises one part by volume turpentine, one part by volume of glycerine, one part by volume of 28% strength aqua ammonia, and two parts by volume of alcohol, preferably grain or denatured alcohol, and two parts of soap. To this is added a sufficient starchy substance, such as common starch or flour to make a fairly stiff and relatively dry paste. Perhaps "relatively dry" does not accurately convey the meaning but what is meant is that the substance has relatively little moisture in its final form, only sufficient to keep the same in a pasty condition. This prevents it from running, as will be further explained, and makes it very much more pleasant to use.

The so-called drawing inks are usually a composition of pure carbon, very often in the form of lamp black and resinous material, such as varnish or shellac, that acts as a binder or carrier. Printer's ink is often made by the use of some pigment such as lamp black, if black ink is desired, and varnish made from linseed oil, rosin and soap. Of course, colored drawing inks may be made from various pigments in combination with resinous materials and can be successfully removed by my compound provided they do not contain dye materials that actually dye the fiber of the paper or cloth.

Turpentine, ammonia and alcohol are all solvents and will dissolve varnish or resinous materials such as are used as the binders or carriers of the pigment in inks of the description that I have mentioned. Ammonia is a more efficient solvent for quick work in the presence of most binders, although the turpentine is a solvent of most binders and also is a quick action solvent. Alcohol is used not only as a solvent but serves to thin the other ingredients to cause their proper distribution and mixture in the paste carrier formed by the starchy substance. This thinning is desirable because if ammonia alone were used, this ingredient being such a strong solvent it would have a tendency to injure the finish of the cloth or paper. The glycerine is used for two purposes. Ammonia and alcohol are relatively volatile substances and glycerine very materially avoids their evaporation from the compound. Furthermore, it has a tendency to aid in protecting the gloss of the paper or cloth. It will be noticed that none of the solvents, alcohol, turpentine or ammonia, are acids. Consequently they are not calculated to impair the gloss of the paper or injure the fabric. The soap is used as it tends to prevent the loss of the solvents and the drying out of the starchy substance. It also has a beneficial effect upon the finish of the cloth or paper.

The starchy substance, which may be common starch or starch with flour or any similar substance, not only acts as a carrier for the solvents and glycerine to make a paste, but it has the function of picking up the carbon or other pigment set free by the action of the solvent.

The paste may be applied to a drawing simply by covering the drawing with a slotted metal plate with the slot over the portion desired to be removed; the paste may then be applied by the finger and rubbed into the spot. This will cause the solvents immediately to take effect and dissolve the binder. This frees the carbon or pigment which spreads over the paper or cloth in sort of a smear, it being carried, however, by the starchy substance which acts as a pick-up medium. A cloth may then be applied to this smear to rub off the starchy substance, taking with it all the pigment and leaving a perfectly clean spot with the gloss of the cloth or paper little, if in any way, impaired so far as the capacity to take more drawing ink without spreading. The paste form, as already alluded to, is not only handy for use but it prevents the ink remover from spreading under the metal plate which has been placed over the drawing to protect the other parts. Consequently the remover may be accurately confined to a defined spot.

It will be obvious that any one or two of the solvents may be omitted and still useful results accomplished by the composition. The evaporation of retarder, either soap or the glycerine may be omitted and the composition will still be a useful product to remove ink, but of course will not keep so long. The protector—glycerine—is not at all essential, for altho it is desirable to preserve the gloss of the paper or fabric this is not absolutely necessary. It will also be obvious that numerous substances can be substituted for starch as a carrier for the solvent and pick up for the pigment. It will be possible to get measurably good results by using simply a solvent of the ink binder and a substance to carry such solvent and pick up the ink pigment set free.

What I claim is:

1. An ink remover composed of a solvent of the carrier of the ink pigment, glycerine, and a pasty-like substance for carrying the glycerine and solvent and acting to pick up the pigment set free by the solvent.

2. An ink remover composed of a solvent of resinous material and a relatively dry pasty substance for carrying the solvent and acting as a carrier for the ink pigment carried by the resinous material.

3. An ink remover having alcohol and a pasty substance acting as a carrier of the alcohol and to pick up the pigment that is set free by the dissolving of the pigment carrier of the ink in the alcohol.

4. An ink remover having alcohol, ammonia and turpentine as solvents of the carrier of ink pigment, and a substance acting as a carrier for said solvent and to pick up the ink pigment set free.

5. An ink remover having alcohol, turpentine, ammonia as solvents of the carrier of the ink pigment, glycerine, and a substance acting as a carrier for said solvent and glycerine, and as a pick up for the pigment set free.

6. An ink remover in which there are one part of turpentine, ammonia and glycerine each and two parts of alcohol, and a substance acting as a carrier for said ingredients and to pick up the pigment.

7. An ink remover, consisting of alcohol, ammonia and turpentine as solvents of the carrier of the ink pigment and a pasty-like substance acting as a carrier for said solvents and to pick up the ink pigment set free.

8. An ink remover, having a solvent of the binder of ink pigment, soap and a pasty substance, acting as a carrier of the solvent and to pick up the ink pigment.

9. An ink remover, comprising alcohol, turpentine, ammonia, glycerine, soap and a pasty substance, mixed together into a paste.

10. An ink remover comprising a solvent of the carrier of the ink pigment belonging to that group of solvents which comprises ammonia, turpentine and alcohol, and a pasty substance for carrying such solvent and picking up the ink pigment set free by the solvent.

In testimony whereof I affix my signature.

FREDERICK E. JACKSON.